United States Patent
Westeng et al.

(10) Patent No.: US 8,325,560 B2
(45) Date of Patent: Dec. 4, 2012

(54) TECHNIQUE AND SYSTEM FOR DERIVING A TIME LAPSE LOW FREQUENCY MODEL USING BOTH SEISMIC DATA AND A FLOW SIMULATION MODEL

(75) Inventors: Kjetil Westeng, Drammen (NO); Thomas Andreas Hope, Stavanger (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 358 days.

(21) Appl. No.: 12/765,307

(22) Filed: Apr. 22, 2010

(65) Prior Publication Data

US 2011/0103184 A1    May 5, 2011

Related U.S. Application Data

(60) Provisional application No. 61/176,571, filed on May 8, 2009.

(51) Int. Cl.
*G01V 1/00* (2006.01)

(52) U.S. Cl. .......................................... 367/38; 703/10
(58) Field of Classification Search .................. 367/38; 703/10
See application file for complete search history.

(56) References Cited

U.S. PATENT DOCUMENTS

| 7,752,022 B2 * | 7/2010 | Fornel et al. ..................... 703/10 |
| 2003/0110018 A1 * | 6/2003 | Dutta et al. ..................... 703/10 |
| 2007/0255500 A1 * | 11/2007 | Pita et al. ........................ 702/11 |

FOREIGN PATENT DOCUMENTS

| GB | 2409900 | 7/2005 |
| GB | 2438306 | 11/2007 |

* cited by examiner

Primary Examiner — Mark Hellner
(74) Attorney, Agent, or Firm — Colin L. Wier

(57) ABSTRACT

A technique includes determining a change in an elastic property of a region of interest at a second time relative to a first time based on a flow simulation model. The technique includes scaling the determined change in the elastic property based on data acquired in a seismic survey.

16 Claims, 4 Drawing Sheets

TECHNIQUE AND SYSTEM FOR DERIVING A TIME LAPSE LOW FREQUENCY MODEL USING BOTH SEISMIC DATA AND A FLOW SIMULATION MODEL

This application claims the benefit under 35 U.S.C. §119 (e) to U.S. Provisional Patent Application Ser. No. 61/176,571, entitled, "DERIVATION OF TIME-LAPSE LOW-FREQUENCY MODEL FROM SEISMIC AND FLOW SIMULATION MODELS," which was filed on May 8, 2009, and is hereby incorporated by reference in its entirety.

BACKGROUND

The invention generally relates to determining technique and system for deriving a time lapse low frequency model using both seismic data and a flow simulation model.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

For purposes of observing changes in a producing field over time, a series of towed seismic surveys of the producing field, separated by months or years, may be conducted. Thus, an initial survey (called "a base survey") may be conducted before or after the well completion equipment is installed, and thereafter, subsequent surveys (called "monitor," or "repeat surveys") are conducted for purposes of observing changes in the producing field. Ideally, the only change between any two of the surveys should be in the fluids (i.e., oil, gas and/or water) that are produced or displaced from the producing field. In time lapse analysis, also called "4-D analysis," differences are taken between the surveys to ideally reveal only the changes in the produced/displaced fluids, with the geology (ideally being the same for each survey) canceling out.

SUMMARY

In an embodiment of the invention, a technique includes determining a change in an elastic property of a region of interest at a second time relative to a first time based on a flow simulation model. The technique includes scaling the determined change in the elastic property based on data acquired in a seismic survey.

In another embodiment of the invention, a system includes an interface and a processor. The interface receives seismic data acquired in a seismic survey conducted in a region of interest. The processor applies a flow simulation model to determine a change in an elastic property of the region of interest at a second time relative to a first time and scales the determined change in the elastic property based on the seismic data.

In yet another embodiment of the invention, an article includes a computer readable storage medium to store instructions that when executed by a computer cause the computer to receive seismic data acquired in a seismic survey conducted in a region of interest. The instructions when executed cause the computer to apply a flow simulation model to determine a change in an elastic property of the region of interest at a second time relative to a first time and scale the determined change in the elastic property based on the seismic data.

Advantages and other features of the invention will become apparent from the following drawing, description and claims.

DETAILED DESCRIPTION

Figure 1:
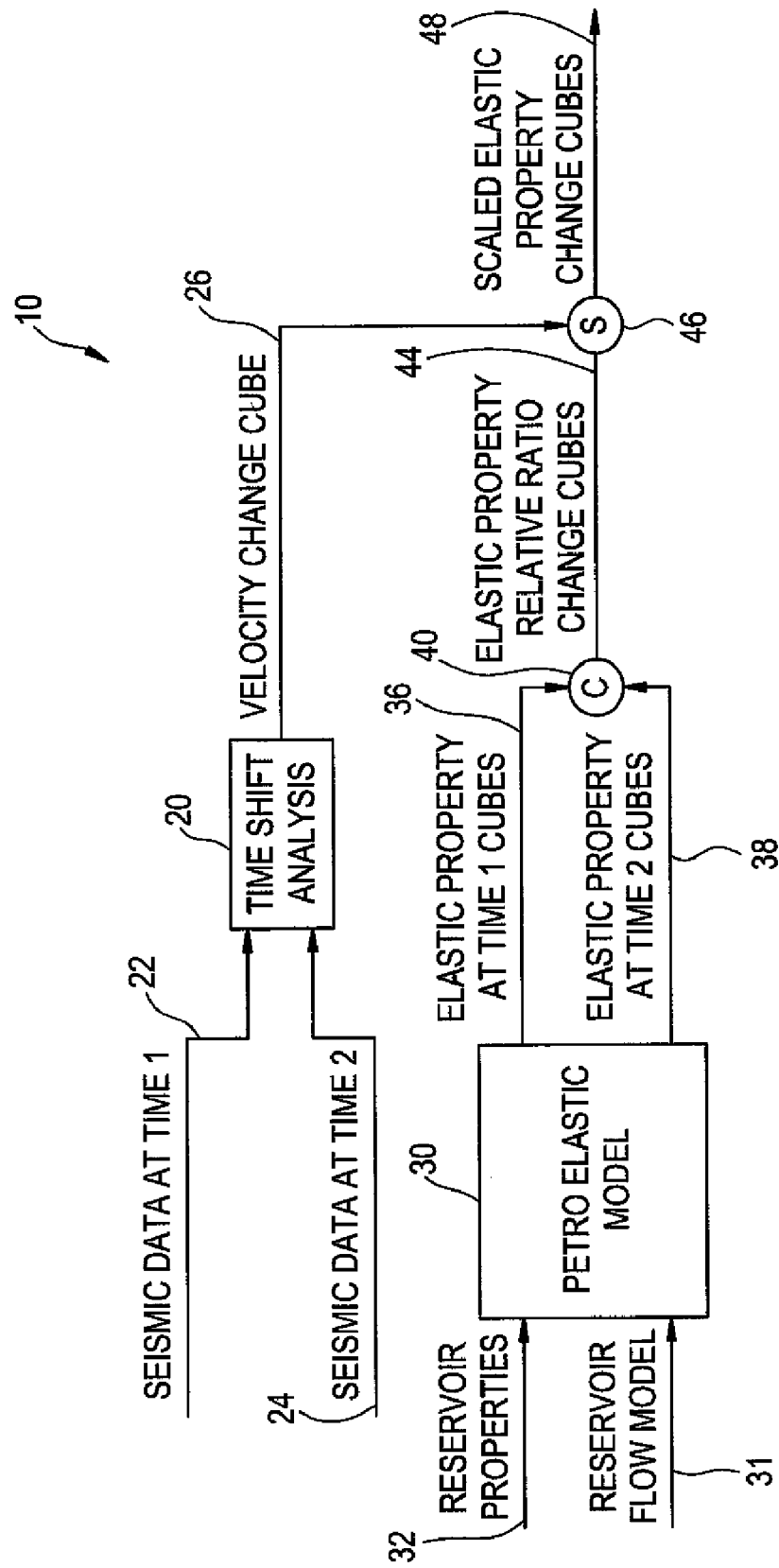
FIG. 1 is a schematic diagram illustrating a system to derive a time lapse, low frequency model based on seismic data and a flow simulation model according to an embodiment of the invention.

Petroelastic forward modeling of a reservoir flow model may be employed for purposes of simulating elastic rock properties (seismic velocity, acoustic impedance, a ratio of the compression wave velocity ($V_P$) to the shear wave velocity ($V_S$), Poisson's ratio and density, as non-limiting examples) from measured reservoir properties (porosity, pressure, net to gross, fluid/gas saturation, etc.) It is useful to obtain a time lapse analysis of the elastic rock properties, as enhanced property predictions support better wellbore planning, formation integrity forecasting and the characterization of subsidence, compaction, damage to the cap rock integrity and fault sealing. Furthermore, rock property predictions also help determine the maximum completion and optimum production for a field when coupled to reservoir pressures and field stress developments.

In accordance with embodiments of the invention described herein, both seismic time lapse analysis and a flow simulation model are used for purposes of deriving a low frequency, time lapse model of the elastic parameters. More specifically, referring to FIG. 1, a system 10 in accordance with embodiments of the invention employs the use of time lapse seismic data and a flow simulation model for purposes of producing scaled elastic property change cubes 48 for the various elastic properties. Each change cube 48, as it name implies, indicates the change over time in a particular elastic property for a three-dimensional (3-D) region of interest, and the change indicated by the cube 48 is scaled by seismic data acquired in a seismic survey.

More specifically, the system 10 includes a petroelastic model 30 that, in response to measured reservoir properties 32 (measured porosities, pressures, net to gross, fluid/gas saturation, etc.) and a reservoir flow model 31 forecasts elastic properties at two different times (called "Time 1" and "Time 2" in FIG. 1) to produce two types of cubes: cubes 36, which represent the forecasted elastic properties at Time 1; and cubes 38, which represent the elastic properties at Time 2. Thus, a particular elastic property cube 36, 38 indicates a given elastic property, at a given time. The system 10 includes a combiner 40, which combines the cubes 36 and 38 to generate elastic property relative ratio change cubes 44. Each change cube 44 indicates two changes: a first percentage change of the elastic property from Time 1 to Time 2; and a percentage change of the elastic property relative to the change in the compression wave velocity ($V_P$) from Time 1 to Time 2. More specifically, the elastic property relative ratio change cubes 44 for acoustic impedance, Poisson's ratio and density may be described according to Eqs. 1, 2 and 3, respectively, below:

$$rAIVP_{ijk}(\text{time } n \rightarrow m) = \frac{1 - \frac{\text{Acoustic Impedance}_{ijk}(\text{time } m)}{\text{Acoustic Impedance}_{ijk}(\text{time } n)}}{1 - \frac{\text{Velocity}_{ijk}(\text{time } m)}{\text{Velocity}_{ijk}(\text{time } n)}}, \quad \text{Eq. 1}$$

$$rPRVP_{ijk}(\text{time } n \rightarrow m) = \frac{1 - \frac{\text{Poisson's Ratio}_{ijk}(\text{time } m)}{\text{Poisson's Ratio}_{ijk}(\text{time } n)}}{1 - \frac{\text{Velocity}_{ijk}(\text{time } m)}{\text{Velocity}_{ijk}(\text{time } n)}}, \quad \text{Eq. 2}$$

$$rRHOBVP_{ijk}(\text{time } n \rightarrow m) = \frac{1 - \frac{\text{Density}_{ijk}(\text{time } m)}{\text{Density}_{ijk}(\text{time } n)}}{1 - \frac{\text{Velocity}_{ijk}(\text{time } m)}{\text{Velocity}_{ijk}(\text{time } n)}}, \text{ and} \quad \text{Eq. 3}$$

where the notation "ijk" represents the orientation in the seismic volume or reservoir grid. The relative ratios are calculated for each sample/cell in the seismic volume/reservoir grid. Thus, as can be seen, each relative ratio change cube 44 indicates the change in a particular elastic property relative to the change of the compression wave velocity.

As also depicted in FIG. 1, the system 10 receives seismic data 22 acquired at Time 1 and seismic data 24 acquired at Time 2. Time shift analysis 20 is employed for purposes of translating the observed time shifts into corresponding velocity changes that appear in a velocity change cube 26. As shown below in Eq. 4, the compression velocity change from Time 1 to Time 2 is approximately equal to the observed time shifts:

$$DVP_{timeshift,ijk}(\text{time } n \rightarrow m) = \quad \text{Eq. 4}$$
$$\frac{DVP_{ijk}(\text{time } n \rightarrow m)}{VP0_{ijk}(\text{time } n)} \approx -\frac{DT_{ijk}(\text{time } n \rightarrow m)}{T0_{ijk}(\text{time } n)},$$

The elastic property relative ratio change cubes 34 are scaled 46 with the velocity changes to produce the scaled elastic property change cubes 48. The result of this scaling is described below for acoustic impedance (Eq. 5), Poisson's ratio (Eq. 6) and density (Eq. 7), as described below:

$$dAI\_LFM_{ijk} = rAIVP_{ijk}(\text{time } n \rightarrow m) * dVP_{timeshift\ ijk}(\text{time } n \rightarrow m), \quad \text{Eq. 5}$$

$$dPR\_LFM_{ijk} = rPRVP_{ijk}(\text{time } n \rightarrow m) * dVP_{timeshift\ ijk}(\text{time } n \rightarrow m), \text{ and} \quad \text{Eq. 6}$$

$$dRHOB\_LFM_{ijk} = rRHOBVP_{ijk}(\text{time } n \rightarrow m) * dVP_{timeshift\ ijk}(\text{time } n \rightarrow m). \quad \text{Eq. 7}$$

Thus, the low frequency model realized in the form of the scaled elastic property change cubes 48, utilizes inputs from both time lapse seismic data and utilizes the output of the petroelastic model 30. The model 30 has an accurate rock physics in each sample throughout the volume. The relationship between the between the changes of each elastic parameter in the low frequency model defined by the model 30. However, the amplitudes of the changes are determined/scaled by the changes in seismic velocity.

It is noted that the architecture that is depicted in FIG. 1 merely illustrates one out of many possible architectures for generating the low frequency, time lapse model. Thus, the skilled artisan would appreciate numerous modifications and deviations therefrom. Regardless of the particular architecture that is used, a technique 50 that is depicted in FIG. 2 may be used to generate a low frequency in accordance with embodiments of the invention.

Figure 2:
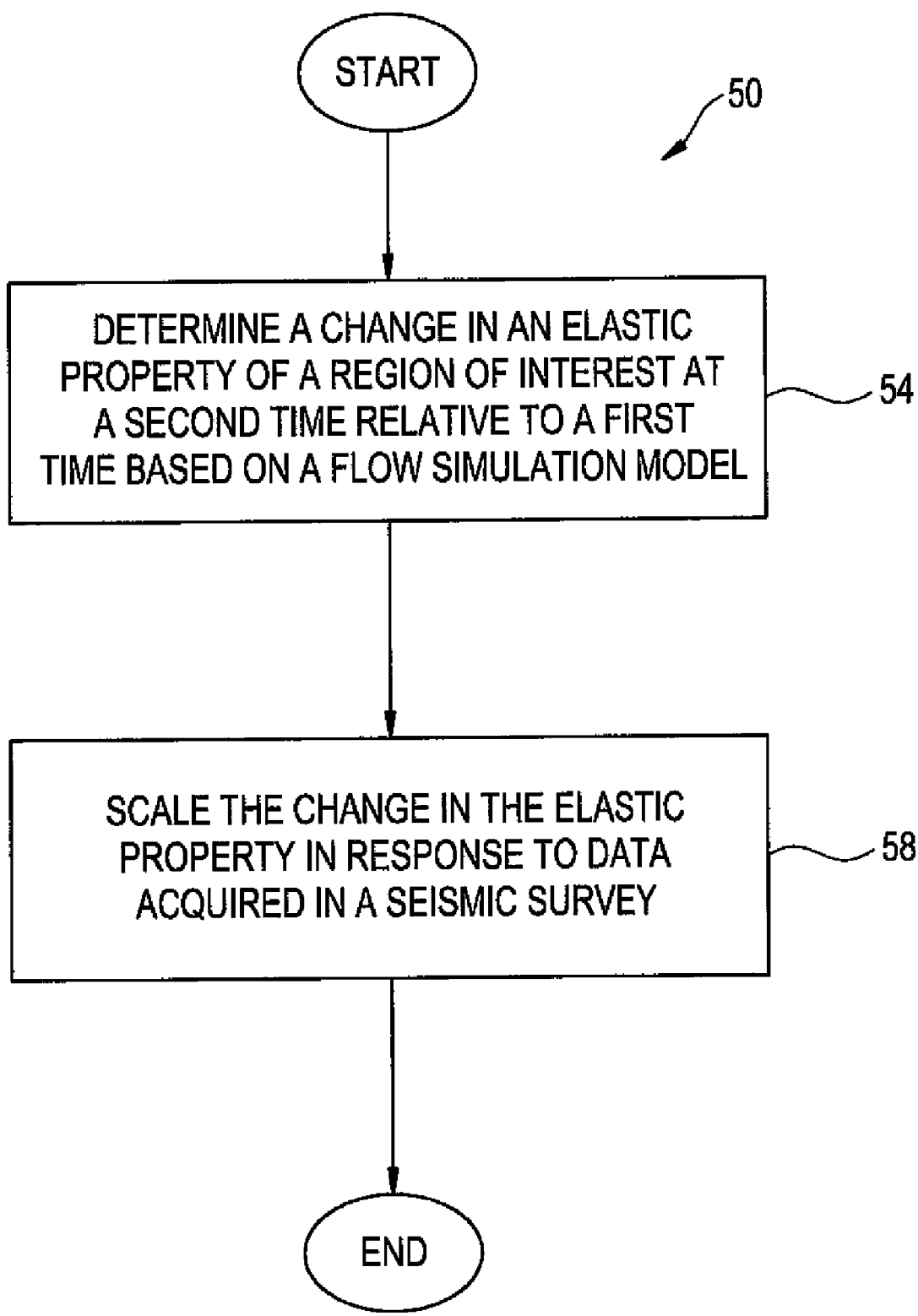
FIGS. 2 and 3 are flow diagrams depicting techniques to derive a time lapse, low frequency model based on seismic data and a flow simulation model according to embodiments of the invention.
Figure 3:
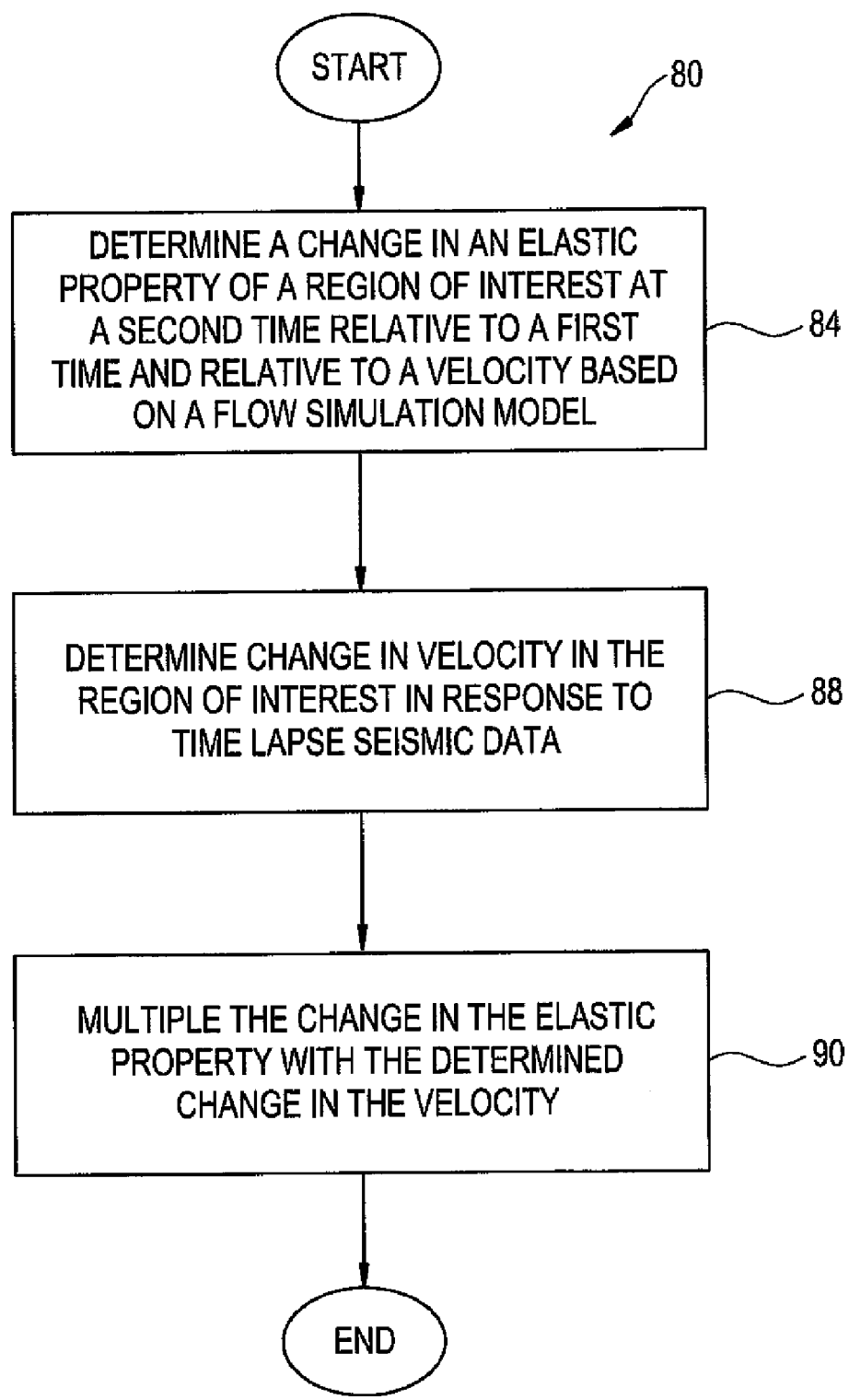

Referring to FIG. 2, the technique 50 includes determining (block 54) a change in an elastic property of a region of interest at a second time relative to a first time based on a flow simulation model and scaling (block 58) the change in the elastic property in response to data acquired in a seismic survey. More specifically, as a depicted in technique 80 that is illustrated in FIG. 3, the technique to derive a low frequency model includes determining (block 84) a change in velocity in a region of interest at a second time relative to a first time based on data acquired in a seismic survey and determining (block 88) a change in velocity in the region of interest in response to time lapse seismic data. The change in the elastic property is multiplied (block 90) by the determined change in the velocity.

As a non-limiting example, the seismic survey that is described herein may be one of numerous different types of seismic surveys. As non-limiting examples, the seismic surveys may be towed seismic surveys in which streamers are towed in a marine environment over a region of interest; a sea bed-based survey in which a sea bed cable is used to acquire seismic data; a terrestrial or land-based seismic survey that may, for example, use a vibroseis survey to acquire seismic data, a borehole-based seismic survey, etc. Regardless of the type of seismic survey employed, the time lapse seismic survey data is formed from a first set of seismic data acquired by the survey at a first time and another set of seismic data acquired in a seismic survey conducted in the same region of interest at a second time.

Figure 4:
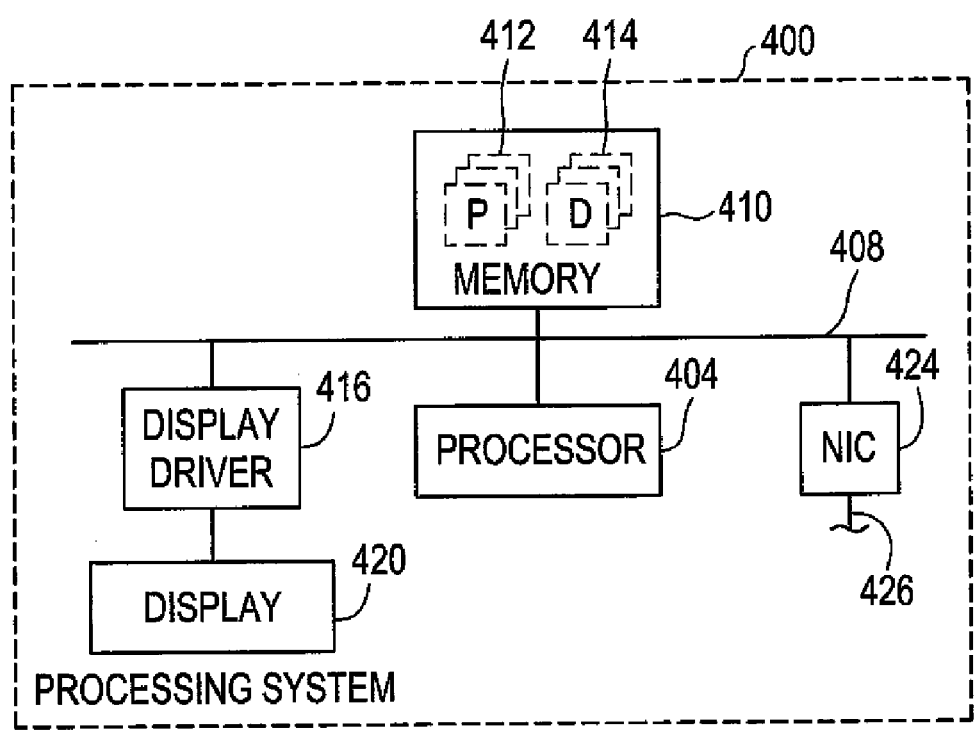
FIG. 4 is a schematic diagram of a data processing system according to an embodiment of the invention.

Referring to FIG. 4, in accordance with some embodiments of the invention, a processing system 400 may be used for purposes of efficiently computing the fracture area inside a cube, pursuant to the techniques that are disclosed herein. It is noted that the architecture of the processing system 400 is illustrated merely as an example, as the skilled artisan would recognize many variations and deviations therefrom.

In the example that is depicted in FIG. 4, the processing system 400 includes a processor 404, which executes program instructions 412 that are stored in a system memory 410 for purposes of causing the processor 404 to perform some or all of the techniques that are disclosed herein. As non-limiting examples, the processor 404 may include one or more microprocessors and/or microcontrollers, depending on the particular implementation. In general, the processor 404 may execute program instructions 412 for purposes of causing the processor 404 to determine a change in an elastic property at a region of interest at a second time relative to a first time based on a flow simulation model, scale the determined change in the elastic property in response to data acquired in a seismic survey, determine cubes depicting an elastic property at Time 1, determine cubes representing the elastic property at Time 2, combine the cubes representing the elastic property at Time 1 and Time 2 to derive elastic property relative ratio change cubes, etc.

The memory 410 may also store datasets 414 which may be initial, intermediate and/or final datasets produced by the processing by the processor 404. For example, the datasets 414 may include data indicative of elastic property at Time 1 cubes, elastic property at Time 2 cubes, elastic property relative ratio change cubes, velocity change cubes, scaled elastic property change cubes, etc.

As depicted in FIG. 4, the processor 404 and memory 410 may be coupled together by at least one bus 408, which may couple other components of the processing system 400 together, such as a network interface card (NIC) 424. As a non-limiting example, the NIC 424 may be coupled to a network 426, for purposes of receiving such data as seismic data acquired at different times, data indicative of reservoir properties, etc. As also depicted in FIG. 4, a display 420 of the processing system 408 may display initial, intermediate or final results produced by the processing system 400. In general, the display 420 may be coupled to the system 400 by a display driver 416. As a non-limiting example, the display 420 may display an image, which graphically depicts the cubes and the tensors, which are determined pursuant to the techniques that are disclosed herein.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
   determining a change in an elastic property of a region of interest at a second time relative to a prior first time based on a flow simulation model; and
   scaling the change in the elastic property in response to data acquired in a seismic survey, wherein scaling the chance in the elastic property comprises:
      determining a change in a velocity of a seismic wave in the region of interest at the second time relative to the first time based on data acquired in the seismic survey; and
      scaling the change in the elastic property based on the change in the velocity.

2. The method of claim 1, wherein the act of determining the change in the velocity comprises performing a time shift analysis.

3. The method of claim 1, wherein the velocity comprises a velocity of a compression wave.

4. The method of claim 1, wherein scaling the change comprises:
   multiplying the change in the elastic property with the change in the velocity.

5. The method of claim 1, wherein the elastic property comprises an acoustic impedance, a Poisson's ratio or a density.

6. A system comprising:
   an interface to receive seismic data acquired in a seismic survey conducted in a region of interest; and
   a processor adapted to:
      apply a flow simulation model to determine a change in an elastic property of the region of interest at a second time relative to a prior first time;
      determine a change in a velocity in the region of interest at the second time relative to the first time based on the data acquired in the seismic survey; and
      scale the change in the elastic property based on the chance of the velocity in the region of interest.

7. The system of claim 6, wherein the velocity comprises a velocity of a compression wave.

8. The system of claim 6, wherein the processor is adapted to perform a time shift analysis to determine the change in the velocity.

9. The system of claim 6, wherein the processor is adapted to:
   multiply the change in the elastic property with the change in the velocity.

10. The system of claim 6, wherein the elastic property comprises an acoustic impedance, a Poisson's ratio or a density.

11. An article comprising a computer readable storage medium to store instructions that when executed by a computer cause the computer to:
    receive seismic data acquired in a seismic survey conducted in a region of interest;
    apply a flow simulation model to determine a change in an elastic property of the region of interest at a second time relative to a prior first time;
    determine a change in a velocity in the region of interest at the second time relative to the first time based on the data acquired in the seismic survey; and
    scale the change in the elastic property in response to the change in the velocity in the region of interest.

12. The article of claim 11, wherein the velocity comprises a velocity of a compression wave.

13. The article of claim 11, wherein the storage medium storing instructions that when executed cause the computer to determine the change in velocity.

14. The article of claim 11, the storage medium storing instructions that when executed cause the computer to:
    multiply the change in the elastic property with the determined change in the velocity.

15. The article of claim 11, wherein the elastic property comprises an acoustic impedance, a Poisson's ratio or a density.

16. The method of claim 1, further comprising:
    deploying a seismic source and a seismic sensor to a predetermined location; and
    conducting the seismic survey using the seismic source and the seismic sensor.

* * * * *